J. Irving,
Turning Ovals.

Nº 24,642.   Patented July 5, 1859.

Witnesses.
Ja. Thomas
A. Lowe

Inventor.
Joshua Irving

UNITED STATES PATENT OFFICE.

JOSHUA IRVING, OF NEW YORK, N. Y.

MACHINE FOR TURNING OVALS.

Specification of Letters Patent No. 24,642, dated July 5, 1859.

*To all whom it may concern:*

Be it known that I, JOSHUA IRVING, of the city, county, and State of New York, have invented certain new and useful Improvements in Chucks for Turning Ovals; and I do hereby declare the following to be a full, clear, and exact description thereof, in which—

Figure 2:
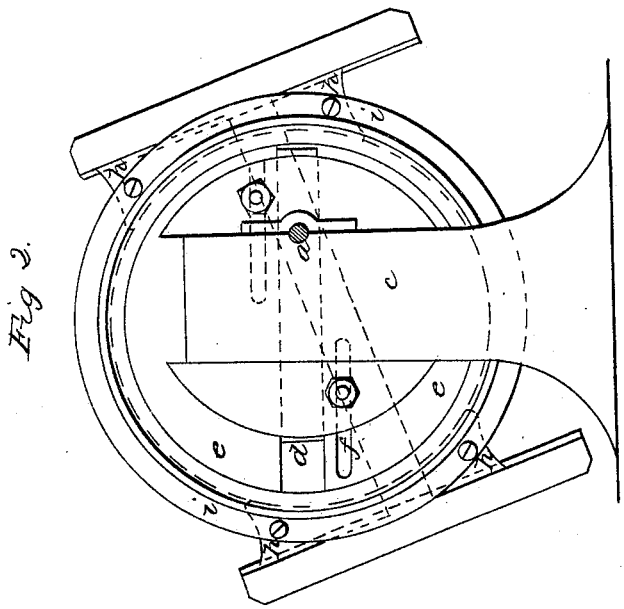
Figure 1:
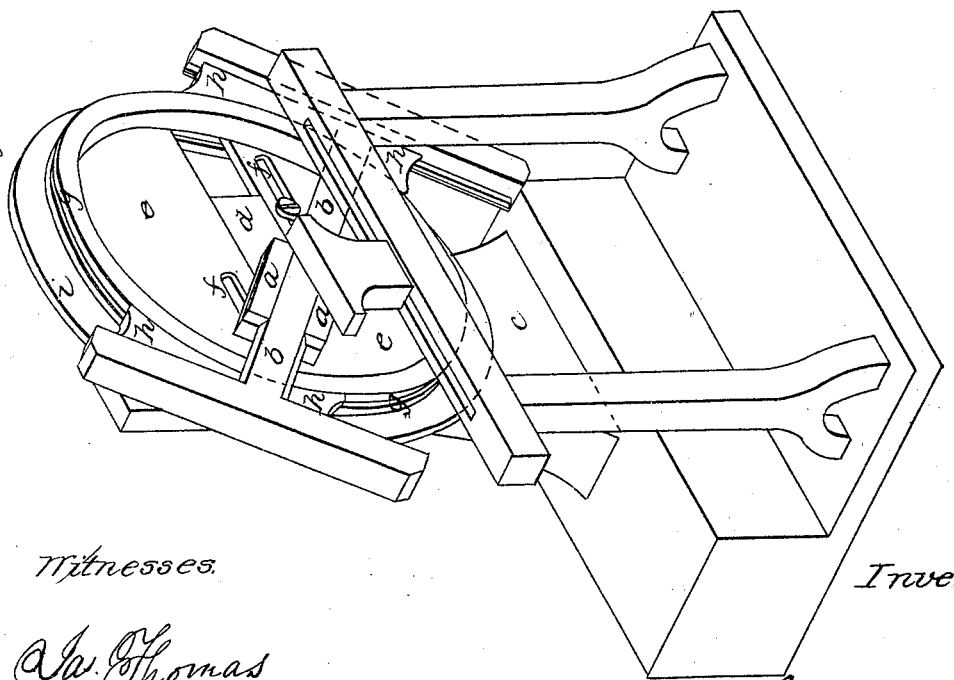

Figure 1, is a perspective front view. Fig. 2, is a back view.

In turning large ovals when the chuck is driven from the center, or mandrel on which the slides work, the weight becomes very irregular, and the whole chuck and article to be turned are thrown quite out of center, so as to throw a great weight upon the ascending or descending sides of the elongated arm of the chuck,—often causing the belts to slip, or the weight of the article created an irregular motion.

My improvement is to obviate these difficulties and defects.

It consists of light centering mandrel $a$, having a grooved guide piece $a'$, in its front end, in which a sliding bar $b$, is guided. This bar has two cross pieces, one at each end, and to this the article to be wrought, is affixed. To the stationary puppet head $c$, that contains the bearings of the mandrel $a$, there is affixed a horizontal piece $d$, which serves as a rib or way on which a disk $e$, slides—this disk $e$, embracing said rib in a slot made through its center, as clearly seen in the drawing. Smaller slots $f$, parallel with the first named, serve for the insertion of bolts, or set screws, to hold the disk $e$, fast when in proper position. The range of motion of disk $e$, is from a point where its center is coincident with that of the mandrel $a$, outward on a horizontal line or line radial with the aforesaid center to any extent that the circumference of the disk will circumscribe. Around the periphery of the disk there is a broad rim with a groove cut therein, as seen at $g$, into which two independent segments $h$, fit. The outer surface, or that opposite the curve of the segment, is straight and parallel to a tangent line thereof. These are also grooved, and receive the crossheads of the bar $b$, guiding and driving them, but allowing a free sliding motion. The segments $h$, are affixed to a rim $i$, formed broad like a pulley, so as to receive a band around it by which the apparatus is turned. By this construction, it will be observed, the driving power is brought to the circle of rotation on which the weight of the article to be turned is balanced—and the irregularities heretofore encountered, are done away with. The rest for holding the tool, is made to slide in front, and is shown at $x$, Fig. 1.

It is obvious that the construction of the parts and their position can be somewhat varied by a mechanism, but they merely relate to convenience of construction, and the purpose to which the chuck is applied, whether wood or metal.

Having thus fully described my improvement in oval turning, what I claim and desire to secure by Letters Patent, is—

The sliding disk and driving rim, combined with the center mandrel and slides, substantially as, and for the purposes set forth.

JOSHUA IRVING.

Witnesses:
ROBERT ONDERDONK,
JAS. W. FRASER.